United States Patent [19]

Kausch et al.

[11] Patent Number: 5,048,686
[45] Date of Patent: Sep. 17, 1991

[54] UNIVERSAL PACKAGE FOR USE IN DIFFERENT KINDS OF EQUIPMENT

[75] Inventors: Thomas J. Kausch, Rochester; Matthew DiPietro, Webster, both of N.Y.

[73] Assignee: Eastman Kodak Company, Rochester, N.Y.

[21] Appl. No.: 587,208

[22] Filed: Sep. 24, 1990

[51] Int. Cl.$^5$ .............................................. B65D 85/00
[52] U.S. Cl. ................................................... 206/455
[58] Field of Search ........................................ 206/455

[56] References Cited

U.S. PATENT DOCUMENTS

| Re. 28,438 | 6/1975 | Schmidt | 206/455 |
|---|---|---|---|
| 2,675,165 | 4/1954 | Roshkind et al. | 229/38 |
| 4,725,011 | 2/1988 | Zanner et al. | 242/67.1 R |
| 4,727,391 | 2/1988 | Tajima et al. | 354/277 |
| 4,860,042 | 8/1989 | Tajima et al. | 354/277 |
| 4,909,389 | 3/1990 | Plessers et al. | 206/451 |
| 4,915,229 | 4/1990 | Yamada et al. | 206/455 |

Primary Examiner—William I. Price
Attorney, Agent, or Firm—G. Herman Childress

[57] ABSTRACT

A package has a light tight pouch that encloses a stack of rectangular sheets of film. The package can be loaded in either of two different kinds of equipment which have means for removing the pouch from the film stack so that the sheets can be fed seriatim from the stack. One kind of equipment requires the package to be oriented so that the pouch can be removed from a narrow side of the package while the second kind of equipment requires the package to be loaded therein so that the pouch can be removed from a long side of the stack of film. The pouch has flaps extending from one long side and one narrow side of the package, and the flaps are engageable by the pouch removing mechanism in the different kinds of equipment.

4 Claims, 7 Drawing Sheets

UNIVERSAL PACKAGE FOR USE IN DIFFERENT KINDS OF EQUIPMENT

CROSS-REFERENCE TO RELATED APPLICATION

Reference is made to commonly assigned co-pending U.S. patent application Ser. No. 587209, entitled "Carrier For Film Package", filed on even date herewith in the names of T. J. Kausch and M. DiPietro.

BACKGROUND OF THE INVENTION

The present invention relates to a package for a stack of sheets of light sensitive material and, more particularly, to such a package which can be loaded in different kinds of equipment having mechanisms for removing the package material from either of two adjacent sides of the sheets.

It is known to provide packages for rectangular sheets of X-Ray film and to load such packages into equipment which removes the package material from the stack of sheets so that the sheets can be fed seriatim for exposure, etc. A package of this kind is disclosed in U.S. Pat. No. 4,909,389, issued Mar. 20, 1990 in the name of H. S. Plessers et al. The package described in such patent includes a U-shaped cardboard wrapper that is placed around a stack of film sheets, and then the sheets and wrapper are covered by a sleeve of flexible packaging material that is open at one end and has a seal at the other end. The open end is folded and taped to the top of the package and the open end can be released after it is placed in a magazine. The sealed end of the package has a flap projecting from the seal. When the package is placed in a magazine, the flap is engaged with a spindle and the open end is unfolded so that rotation of the spindle pulls the sleeve away from the wrapper and sheets of film, thus leaving the sheets within the magazine where they can be removed seriatim for exposure. The film sheets are shown as rectangular in shape and the sleeve is removed by pulling the sleeve from one of the longer side edges of the rectangular sheets of film.

Another similar package is disclosed in U.S. Pat. No. Re. 28,438, which issued on June 3, 1975 in the name of G. Schmidt. This package includes a light proof envelope or bag containing a stack of rectangular x-ray film sheets. The envelope is sufficiently long so that its leading and trailing edges extend beyond the leading and trailing edges of the narrow side of the film sheets in the envelope. A hole in the leading edge of the envelope is engageable by a pin or mandrel for removing the envelope from the stack of sheets. When the film package is inserted into a dispenser machine, the leading end is attached to the mandrel or to a rotatable bar, and the trailing end is cut by a knife. Then the envelope is pulled from the stack of films along the narrow side edge of the stack of films.

The two patents discussed above are examples of packages for stacks of rectangular sheets of film in which the package material is removed from the stack along the narrow edge of the sheets in one kind of equipment or from along the wide edge of the sheets in another kind of equipment. Because the package material is removed after the package is placed in the equipment, such film packages have been designed for use in only one of the two kinds of equipment, and thus are not universally acceptable in both kinds of equipment. This is true even though the film in the packages may be used in either kind of equipment.

Also, in some kinds of equipment it is important that the film package also be oriented so that the emulsion side of each sheet of film faces in one direction (upwardly) or in the opposite direction (downwardly). Thus, when the sheets of film are oriented so that the emulsion faces upwardly, the flap which is engaged for removing the package material may be folded onto the side of the package facing the emulsion side of the film sheets. In this way it will be readily apparent to the operator that the package is properly oriented in the equipment to assure that the emulsion side faces upwardly, or in some other predetermined direction. Similarly, when the emulsion side is to face downwardly the flap may be folded and secured to the side of the package that is opposite from the emulsion side of the film so that the operator will correctly orient the package within the equipment.

The need for removing package material from different side edges of the film stack, and the different orientation required for film packages in different kinds of equipment has resulted in uniquely different packages for each kind of equipment even though the film sheets used by the different kinds of equipment may essentially be identical and interchangeable. This complicates manufacturing and packaging of the film, increases the inventory of packages required by the manufacturer and user of the packages, and thus increases costs incurred by the manufacturer and by the purchaser of the film packages.

SUMMARY OF THE INVENTION

It is an object of the invention to provide a universal package for a stack of rectangular sheets of film which can be placed in and used with two different kinds of equipment requiring removal of the packaging material from different sides of the package, or requiring different orientations of the package within the equipment. The package has a light-tight pouch enclosing a stack of rectangular sheets of film with each sheet in the stack having a side containing a photographic emulsion. The pouch has a first face and a second face positioned on opposite sides of the stack of sheets. In accordance with the invention, the pouch has flap portions extending beyond first and second adjacent side edges of the sheets in the stack. One of the flaps is engageable by a pouch removing mechanism in a first kind of equipment requiring the package to be oriented so that the flap at the first side edge of the package faces the pouch removing mechanism. The other one of the flaps is engageable by a pouch removing mechanism in a second kind of equipment requiring the package to be oriented so that the flap at the second side edge of the package faces the pouch removing mechanism.

The invention and its objects and advantages will become more apparent in the Detailed Description of the Preferred Embodiment of the invention presented below.

BRIEF DESCRIPTION OF THE DRAWINGS

In the Detailed Description of the Preferred Embodiment of the invention presented below, reference is made to the accompanying drawings, in which.

DETAILED DESCRIPTION OF THE PREFERRED EMBODIMENT

Figure 1:
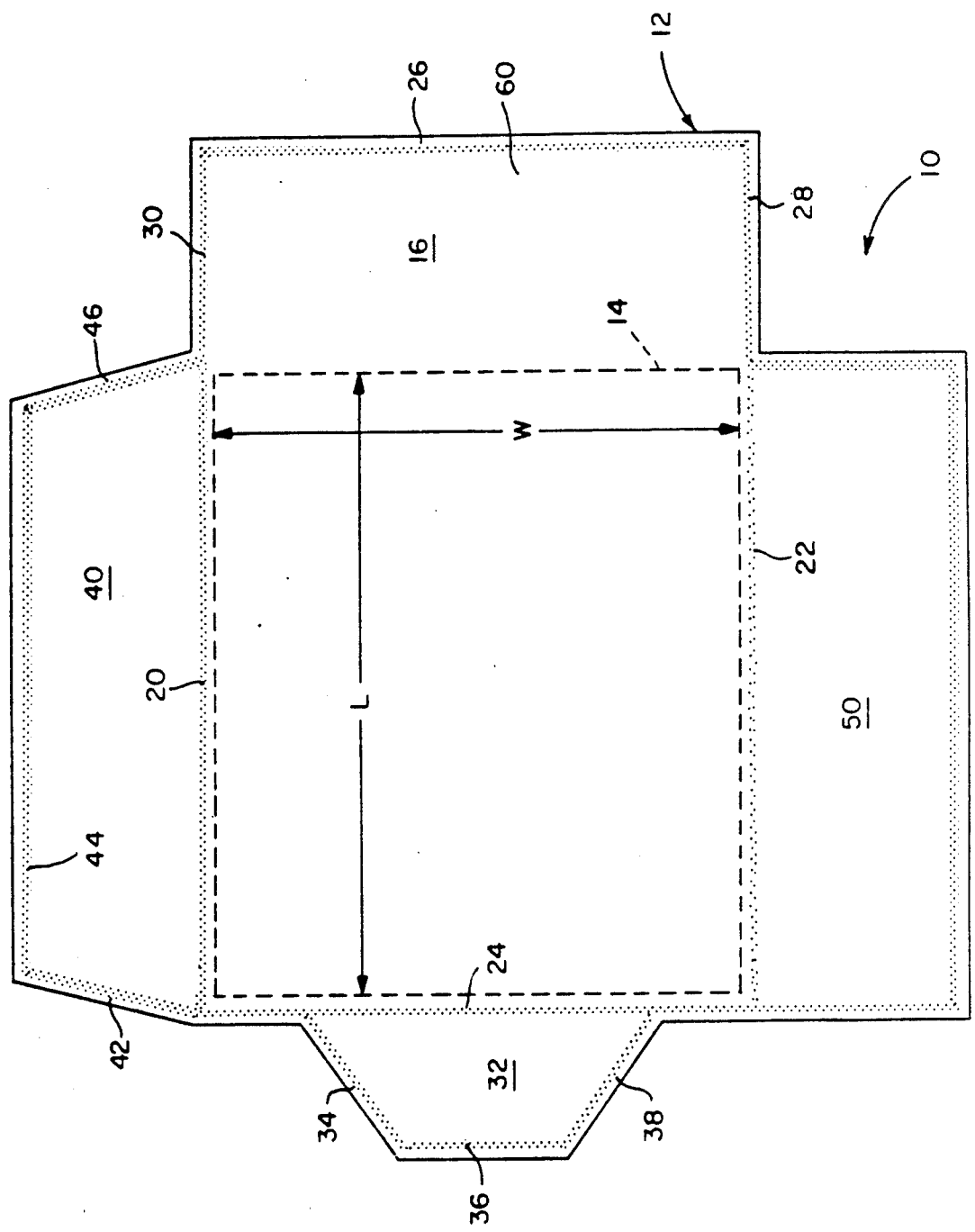
FIG. 1 is a plan view of a package of the invention in an unfolded condition and illustrating in phantom a stack of film sheets inside the package.
Figure 2:
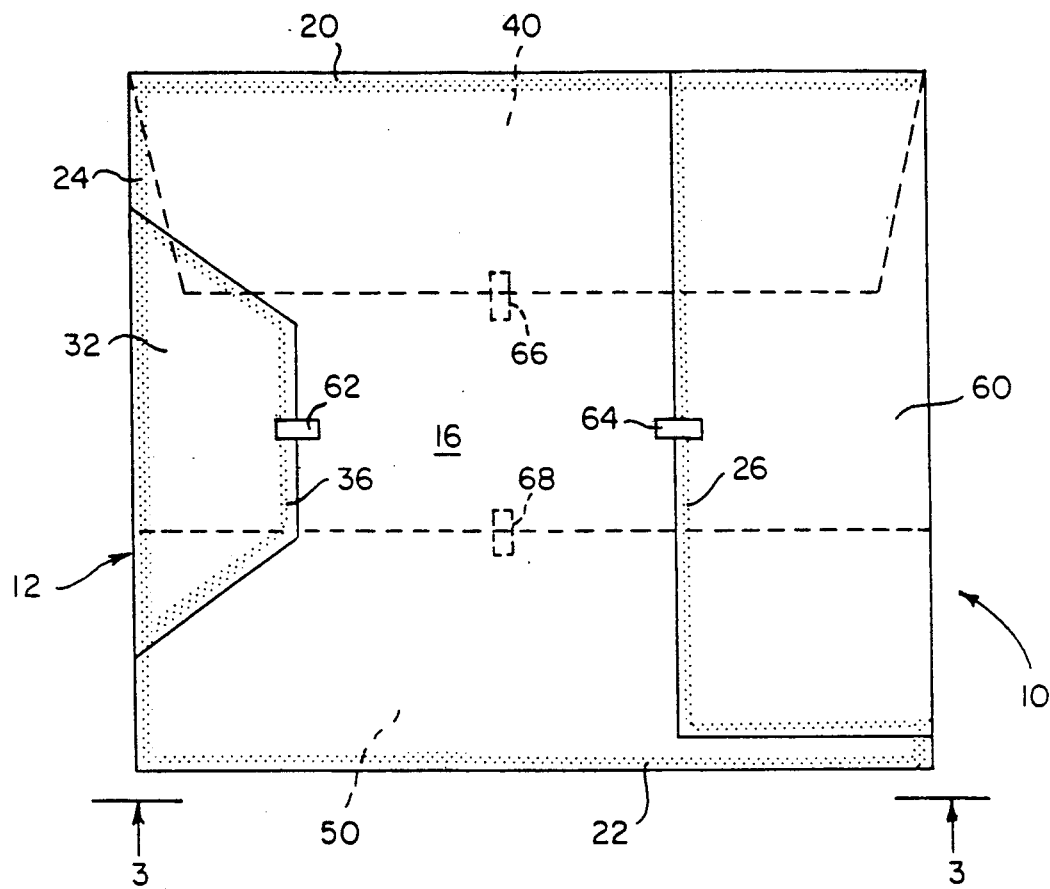
FIG. 2 is a view similar to FIG. 1 but showing the package folded and ready for shipment and for loading into equipment where the pouch is removed from the film sheets.
Figure 3:
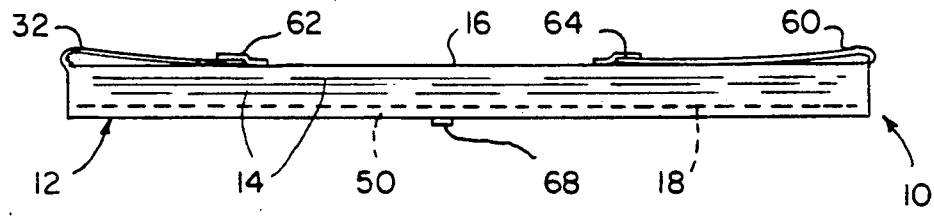
FIG. 3 is a side view of the FIG. 2 package taken along line 3—3 of FIG. 2.

Referring initially to FIGS. 1-3 of the drawings, a package of the invention is generally designated 10 and comprises a light-tight pouch 12 that completely encloses a stack of rectangular sheets of film 14. By way of example, the sheets of film 14 may comprise sheets of x-ray film having a length L and a width W. Rectangular sheets of x-ray film are available from manufacturers in various sizes, for example, 35 cm×43 cm (14"×17"). The film sheets each have emulsion on at least one side thereof. The package 10 is adapted to be placed in two different kinds of equipment. One kind may require the emulsion side of the film sheets to face upwardly in the apparatus, while another kind of apparatus may require the emulsion side to face downwardly. Thus, the emulsion side may face downwardly as viewed in FIGS. 1-4 and upwardly as viewed in FIG. 5.

Pouch 12 can be formed from two pieces of material cut to the shape shown in FIG. 1 during manufacture of the pouch. The pouch 12 has a first face 16 that faces upwardly as viewed in FIGS. 1-4 and a second face 18 that faces downwardly as viewed in FIG. 3 and upwardly as viewed in FIG. 5. Faces 16,18 are on opposite sides of the stack of sheets 14 in the package.

Faces 16,18 of the pouch are secured together around the edges to form a space within the package that is somewhat larger than the stack of film sheets 14. Preferably, pouch 12 is formed from sheets of heat sealable material so that the faces are secured together by lines of heat sealing. More specifically, as shown in FIG. 1, the faces 16,18 can be secured together by parallel lines of heat sealing 20,22 spaced from each other on the two relatively long sides of the sheets of film 14 and by a heat seal line 24 which extends between lines 20,22 along one end of the stack of film sheets 14. Lines of heat seal 26, 28 and 30 seal the right end of the package as viewed in FIG. 1 and jointly extend between the heat seal line 20 and the heat seal line 22. In fabricating the package the heat seal line 26 can be the last heat seal formed so that the package remains open at the right end as viewed in FIG. 1 to enable the film sheets to be loaded into the package through the open end. Then the heat seal line 26 is formed to fully enclose the sheets within the package in a light-tight manner. The heat seal lines 20, 22, 24, 26, 28 and 30 jointly define side edges of the package and enclose a generally rectangular space for the film sheets.

A flap 32 projects from the narrow side edge of the package formed by the heat seal line 24. Flap 32 preferably is formed by an extension of the upper face 16 and lower face 18 of the package and, when formed of two different pieces of material, the flap preferably is bounded by lines of heat sealing as shown at 34, 36 and 38.

A second flap 40 extends from the wide side edge of the package formed by the heat seal line 20, such being adjacent the side edge where flap 32 is located. Flap 40 is shown as substantially longer than flap 32, the relative dimensions of the flaps being selected so that they will be engageable with the pouch removing mechanisms in two different kinds of equipment. Flap 40 also is formed by extensions of the material forming the faces 16 and 18 of the package, and the side edges of flap 40 are secured together by lines of heat sealing 42,44 and 46. If desired, flaps 32, 40 can be made from pieces of material separate from other portions of the pouch. This permits the flap to be made of a stronger, more tear-resistant material than other portions of the pouch.

A portion of the pouch designated 50 extends between the heat seal line 22 and the adjacent long side edge of the stack of sheets. Portion 50 extends between heat seal lines 24,30 and thus, is slightly longer than the length of the film sheets. A similar extending portion 60 is located between heat seal line 26 and the adjacent edge of the stack of sheets 14, and between the heat seal lines 20 and 28. Portions 50, 60 comprise the trailing end portions during removal of the pouch from the film sheets as described later in connection with FIGS. 4 and 5.

After the pouch has been loaded with film and all of the various heat seal lines have been formed, the flap 32 and portion 60 of the pouch are folded over opposite end portions of face 16 of the pouch and secured in place in any suitable manner, such as by the use of pieces of removable pressure sensitive tape shown at 62 and 64 in FIGS. 2 and 3. Similarly, the flap 40 and portion 50 are folded over the face 18 of the package and secured in place by pieces of tape shown at 66 and 68 in FIGS. 2 and 3. This results in a generally rectangular package 10 that is slightly longer and wider than the dimensions of the sheets of film 14. A package of this kind can be easily loaded into a box or other carrier with other similar packages for shipment to a customer.

Figure 4:
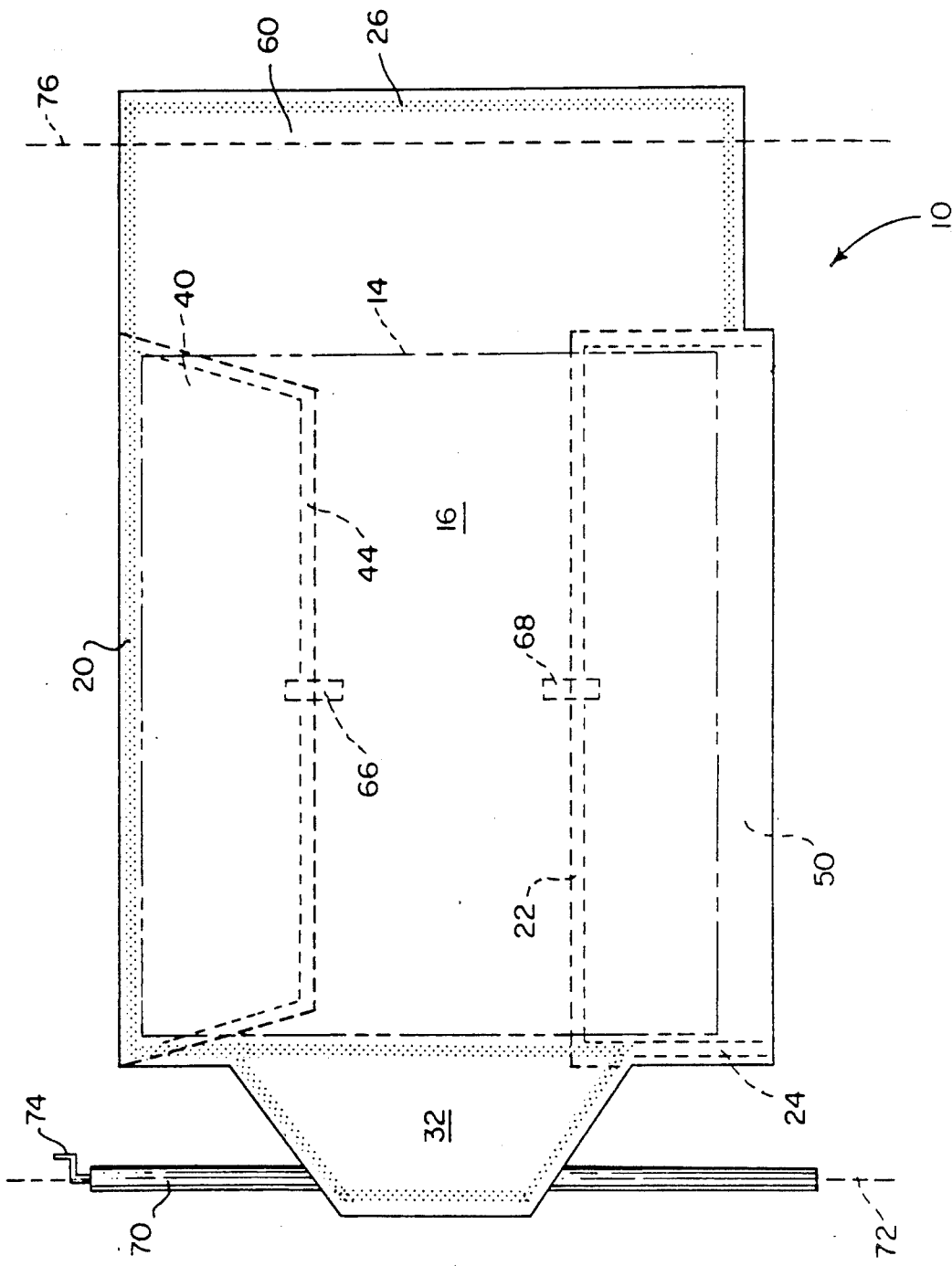
FIG. 4 is a plan view of the package with portions thereof in an unfolded condition and showing its relationship to a mechanism for removing the pouch from the sheets of film when the package is used in one kind of equipment.
Figure 5:
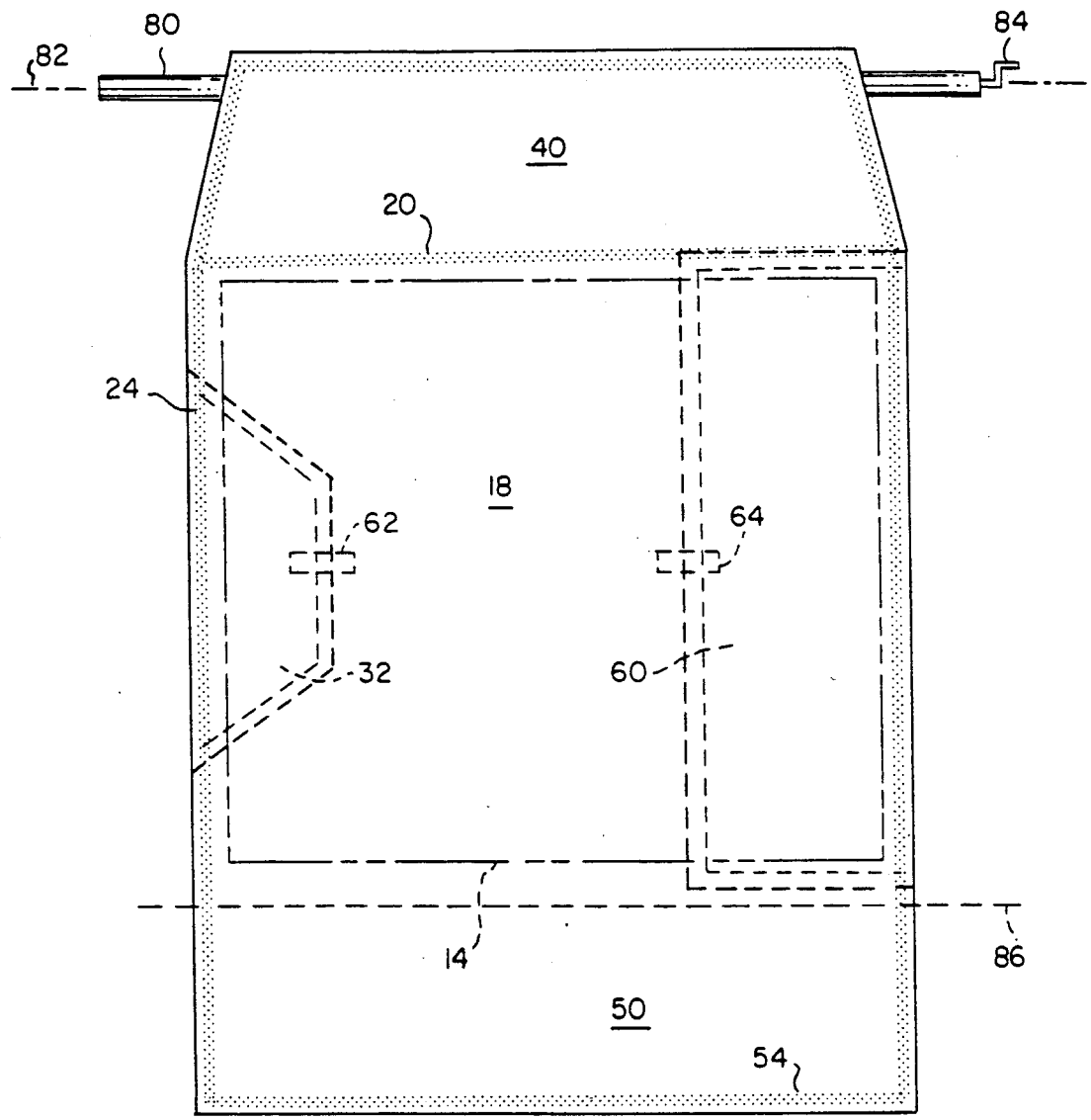
FIG. 5 is a view similar to FIG. 4, but showing portions of the package unfolded and relative to a pouch removing mechanism used in a second kind of equipment.

FIGS. 4 and 5 illustrate how the package 10 can be used in two different kinds of apparatus. More specifically, FIG. 4 illustrates use of the package 10 in equipment wherein the film sheets may have the emulsion side facing downwardly when loaded into the equipment and wherein the package is removed from the film in a direction perpendicular to the width W of the film. The equipment comprises a spindle 70 that is rotated about its axis 72 in any suitable manner, such as by a crank shown at 74, or by coupling the spindle to a motor (not shown). When package 10 is placed in the equipment, the spindle is adjacent the side edge of the package defined by heat seal line 24. The pieces of tape 62, 64 are removed and the flap 32 is extended and engaged with the spindle 70 in any suitable manner. Spindles for engaging flaps on packages as shown in FIG. 4 are known in the art and need not be described in more detail here. For example, the spindle can be connected to the flap 32 by threading the flap through a slot in the spindle, by attaching it to the spindle with strips of Velcro or other suitable material, by the use of holes in the flap and projections on the spindle, etc. Spindle 70 may be located in a magazine that receives the package 10 and which provides a light-tight environment for the sheets of film 14 after the pouch is removed from the sheets of film.

Once flap 32 is attached to spindle 70, the package is cut along a line generally shown at 76 between the heat seal line 26 and the adjacent edge of the stack of sheets 14, thereby opening the right side of the package as viewed in FIG. 4. This cutting operation can be accomplished by a knife in the equipment, for example. Then crank 74 is turned to rotate the spindle 70 and wind the pouch material onto the spindle 70 thus leaving the sheets 14 in a stack in the magazine or on a support in the equipment. The sheets can then be removed seriatim by a sheet feeding device (not shown). By way of example, the sheet feeding device may comprise one or more suction cups that engage the upper sheet in the stack and removes it from the stack.

FIG. 5 illustrates use of the package 10 in a different kind of equipment wherein the emulsion side of the sheets of film 14 face downwardly, as viewed in FIG. 5 and wherein the packaging material is removed from the film in a direction perpendicular to the lenght L of the sheets of film. The equipment comprises a spindle 80 that is rotatable about an axis 82 by rotation of a handle 84, for example. When the package is loaded into the equipment the spindle is adjacent the side edge defined by heat seal 20 of the package. The spindle is adapted to engage the flap 40 for winding the pouch forming the package onto the spindle in response to turning of the handle 84. Before handle 84 is turned, the package is cut along a line shown at 86 which lies between the heat seal line 22 and the adjacent edge of the stack of sheets 14. After the package has been cut along line 86, handle 84 is rotated to wind the pouch material onto the spindle 80 and thereby leave the stack of sheets 14 in a magazine or on a support in the equipment. The sheets are removed seriatim by suction cups or other sheet feeding devices.

It is known to provide a protective film carrier between the stack of film sheets 14 and the pouch 12. Such carriers protect the upper and lower film sheets of the stack from pressure marks that could be induced if the upper and lower faces of the package were engaged by a sharp edge or point. Such known carriers may be generally U-shaped or J-shaped and comprise a lower panel at the bottom of the stack of sheets that is essentially the same size as the sheets, an upper panel that is the same width as the sheets but shorter than the length of the sheets to provide an area where a suction cup or other sheet feeding device can engage the upper sheet in the stack. The carriers may have an edge connecting the upper and lower panels. The edge assists in preventing sheets from being pulled from the stack as the pouch is withdrawn from the stack of sheets and the carrier. Such carriers are also known in the art as wrappers or protective boards. Carriers of this kind are generally disclosed in the before-mentioned U.S. Pat. No. 4,909,389, and in U.S. Pat. No. 4,915,229, issued Apr. 10, 1990 in the names of S. Yamada et al.

FIGS. 6-11 illustrate embodiments of improved carriers particularly suitable for use with the package of the present invention. Each of these embodiments provides access by a sheet removing device to approximately 10 cm (4 inches) of the top sheet of the film stack whether the carrier and film stack are in a position wherein the emulsion side of the film faces upwardly or whether the emulsion side of the film faces downwardly. In other words, this access is provided when the package is loaded into either of two kinds of equipment as described hereinbefore.

Figure 6:
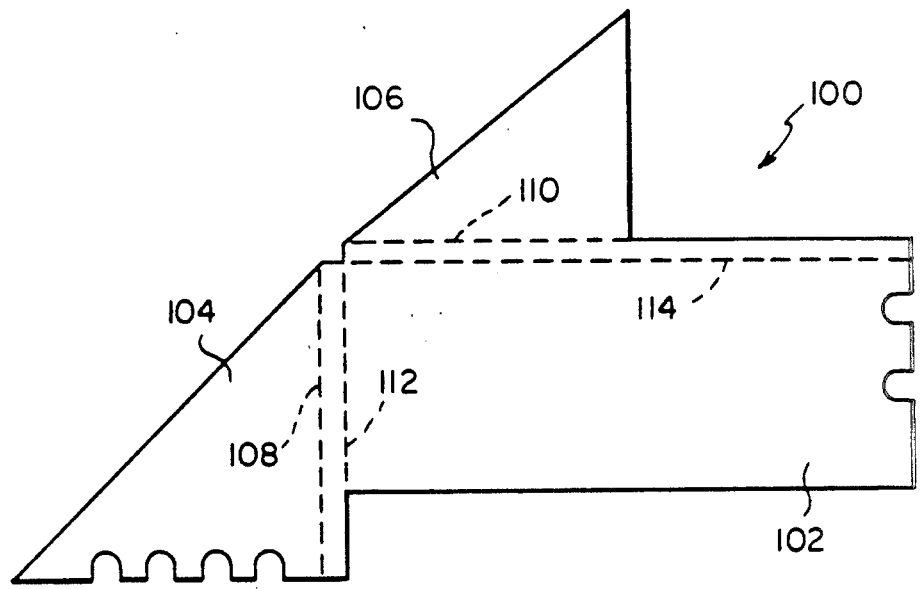
FIG. 6 is a plan view of a blank that can be used for forming a carrier for the film package.
Figure 7:
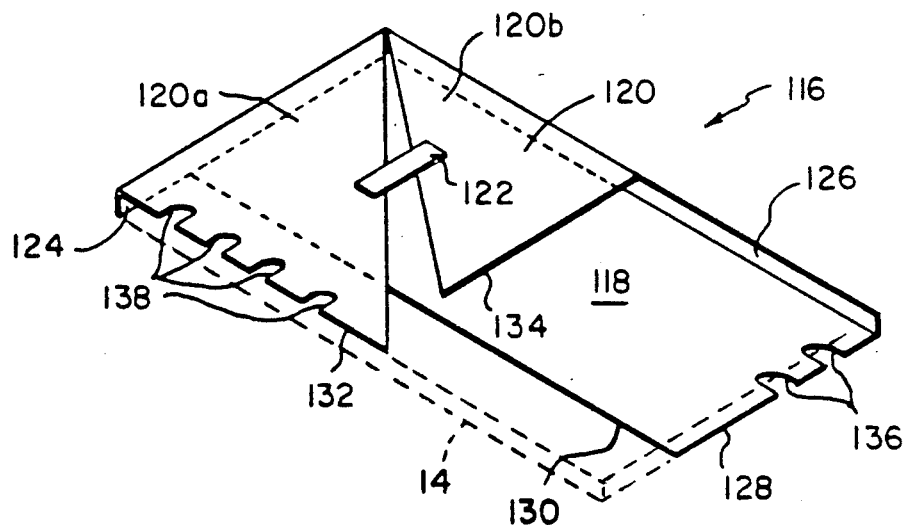
FIG. 7 is a perspective view showing the blank of FIG. 6 folded to form a carrier.

Referring now to FIGS. 6 and 7, FIG. 6 shows a blank or sheet 100 of a material suitable for use as a carrier, such as a thin bleached white stiffener board. Sheet 100 has a shape that enables it to be formed into the carrier shown in FIG. 7. More specifically, the sheet comprises a generally rectangular portion 102 and two triangular portions 104,106 which project from two adjacent side edges of portion 102. The triangular portions are substantially the same size. Sheet 100 is creased or cut along lines 108,110 to define weakened areas which enable the portions 104,106 to be folded along these lines during assembly of the carrier. Other weakened or cut lines 112,114 are provided in spaced and generally parallel relation to lines 108 and 110 respectively. By folding upwardly on lines 112,114 and then folding the triangular portions 104,106 along lines 108,110, the sheet 100 can be formed into the carrier generally designated 116 in FIG. 7.

Carrier 116 comprises a lower wall 118 formed from portion 102 of the sheet 100. An upper wall 120 of the carrier comprises two triangular portions 120a and 120b which are formed from sheet portions 104 and 106, respectively. Portions 120a,120b can be secured together by a pressure-sensitive tape 122, if desired. Carrier 116 also has an edge wall 124 formed by the portions of sheet 100 between the lines 108,112. Similarly, an edge wall 126 is formed by the portions of sheet 100 between lines 110 and 114. Lower wall 118 is substantially parallel to upper wall 120, and edge walls 126, 128 are perpendicular to the lower and upper walls. The height of walls 126, 128 is slightly greater than the thickness of the stack of sheets 14.

FIG. 7 shows the relationship between the stack of film sheets 14, shown in phantom, and the carrier. The dimensions of bottom wall 118 are such that the distance between edge 128 of wall 118 and the edge wall 124 corresponds to the length L of the sheets of film 14. Also, the dimension of wall 118 between edge 130 and the edge wall 126 is narrower than the width W of the sheets of film by about 10 cm. Wall 120 of the carrier has a dimension between edge 132 of the wall and the edge wall 126 which corresponds to the width W of the sheets of film 14 and the other dimension of wall 120 between edge 134 and edge wall 124 is about 10 cm less than the length L of the sheets of film 14. Thus when the sheets of film are placed within the carrier 116 between walls 118 and 120, the sheets of film are accessible by a sheet removing device, such as suction cups, in the area between edges 128 and 134 of the carrier when the carrier is positioned as shown in FIG. 7, and between the edges 130 and 132 of the carrier when the carrier and film package are inverted from the FIG. 7 position.

A plurality of spaced holes or notches 136 are provided in wall 118 along or adjacent edge 128 of the wall. Also, a plurality of spaced holes or notches 138 are provided in wall 120 along or adjacent the edge 132 of the wall. These holes or notches are located along the walls at positions where they will be aligned with suction cups used for removing sheets of film from the package. More specifically, suction cups will engage the sheets of film directly above the notches 136 and, when the last sheet has been removed, the suction cups will sense the absence of the sheet due to the inability of the vacuum system to attract a sheet to the suction cups. Notches or openings for this purpose are known in the art and need not be described in more detail here. The number and arrangement of holes or notches 136,138 will depend, of course, on the sheet removing devices in the equipment which receives the package.

Figure 8:
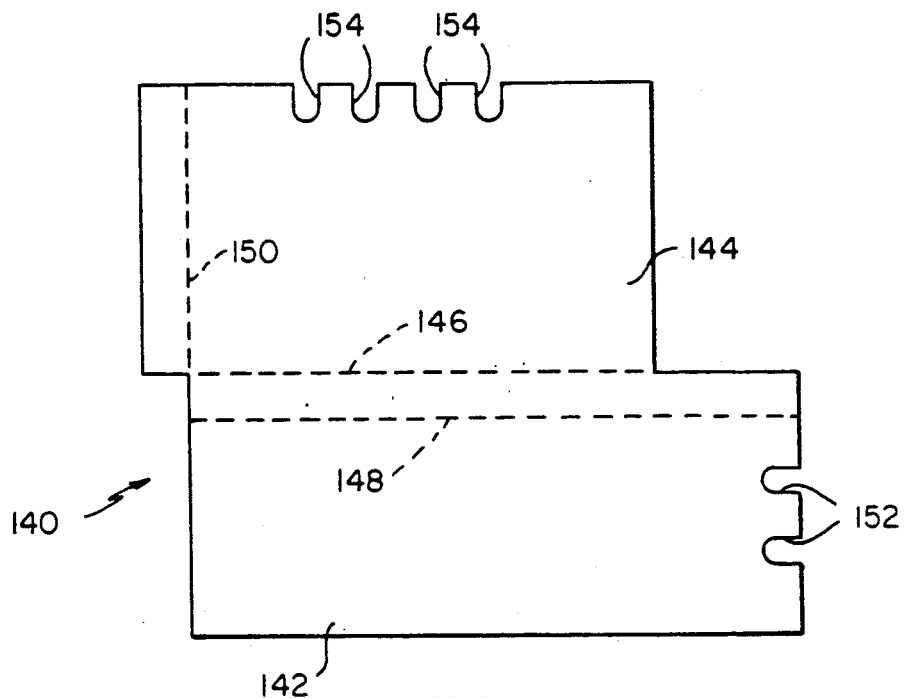
FIG. 8 is a view of another blank that can be used for forming a carrier for the package.
Figure 9:
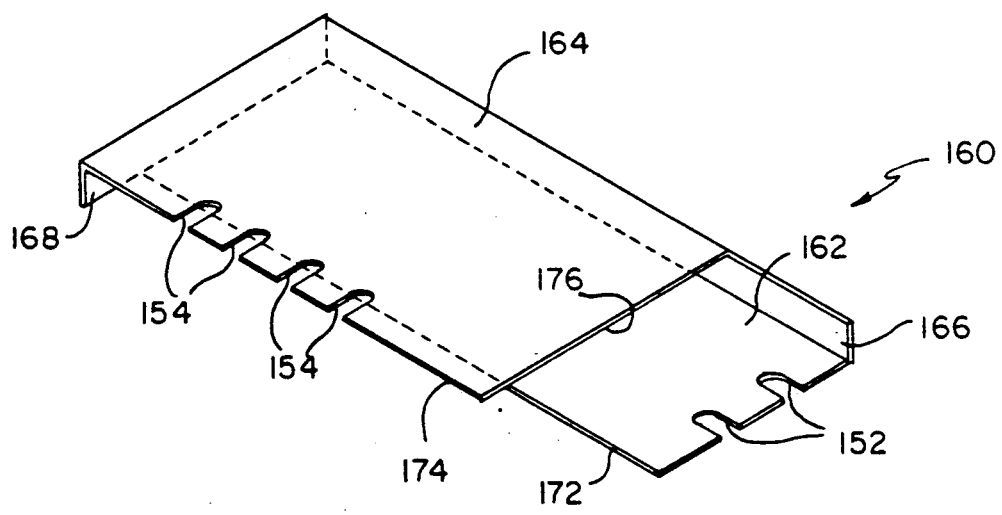
FIG. 9 is a perspective view showing a carrier formed from the blank of FIG. 8.

Other embodiments of a blank and a carrier are shown in FIGS. 8 and 9. In FIG. 8, a blank or sheet 140 for forming a carrier comprises two generally rectangular portions 142 and 144 separated by a cut or weakened line 146 so that the sheet can be folded along that line. A similar cut or weakened line 148 is provided in portion 142 parallel to line 146 and spaced from that line by a short distance. Another cut or weakened line 150 is provided in portion 144. Line 150 is parallel to and spaced a short distance from a side edge of portion 144, and it is perpendicular to lines 146,148. Elongated notches 152 are provided in a narrow edge of the rectangular portion 142, and similar notches 154 are provided along the relatively wide edge of portion 144.

Sheet 140 is folded along lines 146, 148 and 150 to form a carrier generally designated 160 in FIG. 9. Carrier 160 comprises a rectangular wall 162 formed by the part of sheet portion 142 between the line 148 and the bottom edge of the sheet as viewed in FIG. 8. A second wall 164 of the carrier is formed by the part of sheet portion 144 between line 150 and the right edge of portion 144. An edge wall 166 of the carrier is defined by the portion of sheet 140 between lines 146,148, and a second edge wall 168 is formed by the portion of the sheet 140 between line 150 and the left edge of the sheet. Walls 162,164 are substantially parallel to each other, and edge walls 166,168 are perpendicular to walls 162,164. The edge walls have a height that separates the walls 162,164 by a distance substantially equal to the thickness of the stack of sheets 14 to be loaded into the package. If desired, the lower edge of wall 168 and the left edge of wall 162 can be secured together by, for example, a piece of pressure-sensitive tape (not shown).

The stack of film sheets 14 is placed within the carrier with the relatively long side edge of the film sheets being located against the edge wall 166 and the relatively short side edge of the film sheets being against the edge wall 168. As in the previous embodiment, the length of wall 162 from edge wall 168 to edge 170 of wall 162 corresponds to the length L of the sheets of film. Also, the width of wall 162 from edge wall 166 to the edge 172 is less than the width W of the film sheets by about 10 cm.

The width of wall 164 from edge wall 166 to edge 174 of wall 164 corresponds to the width W of the film sheets, while the dimension of wall 164 from edge wall 168 to edge 176 is about 10 cm less than the length L of the film sheets. Thus, about 10 cm of the film is available for engagement by a sheet feeding device whether the carrier with the stack of films therein, is oriented as shown in FIG. 9 or in a position inverted from the position shown in FIG. 9.

Figure 10:
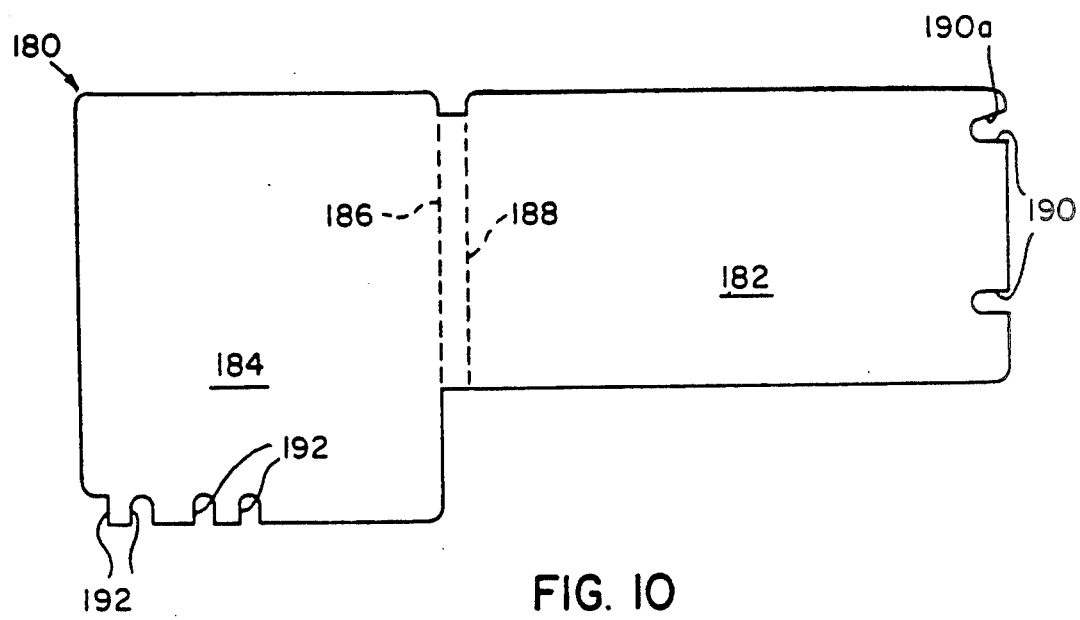
FIG. 10 is a view of a still further blank that can be used for forming a carrier for the package.

FIG. 10 illustrates another embodiment of a carrier blank or sheet generally designated 180. Sheet 180 has a first rectangular portion 182 and a second integral rectangular portion 184. The upper edges of portions 182, 184 are substantially in alignment. Sheet 180 is cut or weakened along two spaced parallel lines 186,188 with the line 186 being in alignment with the right edge of portion 184. Notches or holes 190 are formed in portion 182 and similar notches 192 are formed in portion 184.

Figure 11:
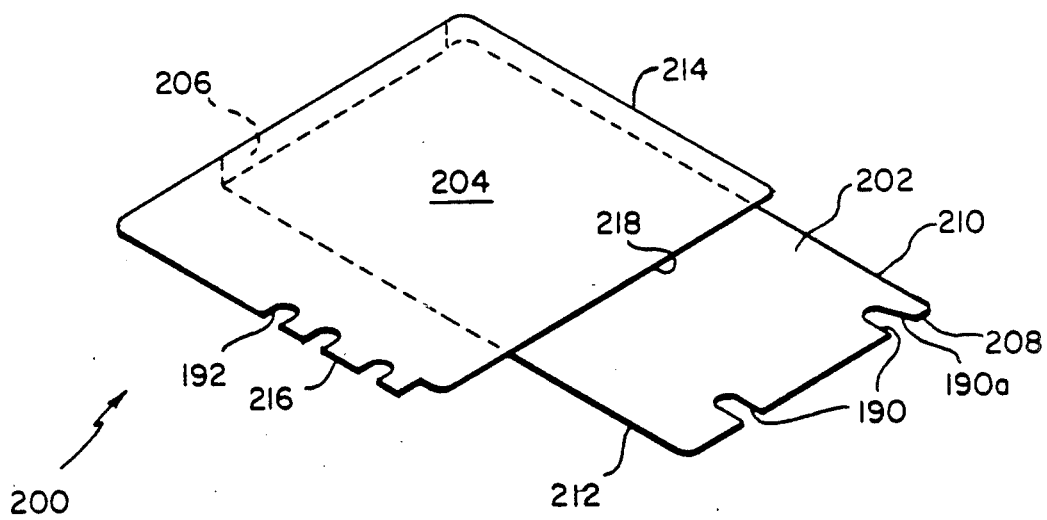
FIG. 11 is a perspective view illustrating a carrier formed from the blank of FIG. 10.

Sheet 180 of FIG. 10 is folded along lines 186,188 to form a carrier generally designated 200 in FIG. 11. Carrier 200 comprises a wall 202 formed by sheet portion 182 and a second wall 204 formed by sheet portion 184. Walls 202,204 are in generally parallel planes and are separated by an edge wall 206 formed by the portion of sheet 180 between the lines 186,188. Edge wall 206 is perpendicular to walls 202, 204, and the height of wall 206 is slightly greater than the thickness of the stack of sheets 14.

As in the previous embodiments, edge 208 of wall 202 is spaced from edge wall 206 by a distance corresponding to the length of the stack of film sheets 14 while the distance between side edges 210 and 212 of wall 202 is about 10 cm less than the width of the stack of sheets. Similarly, the distance between edges 214 and 216 of wall 204 corresponds to the width of the stack of sheets 14 and the distance between edge 218 of wall 204 and the edge wall 206 is about 10 cm less than the length of the film sheets. Thus, about 10 cm of the top film sheet is exposed when the stack of films is positioned between walls 202 and 204 whether the carrier is oriented as shown in FIG. 11 or inverted from the position shown in FIG. 11. Here, again, the holes or notches 190,192 are located so they are aligned with suction cups of a sheet feeding device when the film package is loaded into either of the two different kinds of equipment mentioned before.

The carriers 116, 160 and 200 shown in FIGS. 7, 9 and 11, respectively, are positioned within film package 10 so that the respective walls 118,162 and 202 are in contact with the face 18 of the package while walls 120, 164 and 204 are in contact with face 16 of the package. Edge walls 124, 168 and 206 extend along and adjacent the edge of the package defined by the heat seal line 24 while edge walls 126, 166 and edges 210, 214 of walls 202 and 204 are adjacent the edge of the package defined by the heat seal line 20. Thus, the carriers are oriented as shown in FIGS. 7, 9 and 11 when the package 10 is positioned in equipment as shown in FIG. 4. Similarly, the carriers are inverted from the positions illustrated in FIGS. 7, 9 and 11 when the package is positioned in an apparatus as shown in FIG. 5. Suitable labels (not shown) can be provided on faces 16 and 18 of the package instructing the operator how to orient the package when it is loaded into each of the two kinds of equipment that receive the package.

The carriers 116 and 160 of FIGS. 7 and 9 each have two edge walls 124,126 and 166,168. These edge walls are located in the package along the same edges as flaps 32 and 40. These side edges prevent sheets 14 of film from being withdrawn when the pouch is removed by a spindle 70 along the side edge 24 of the package or a spindle 80 along side edge 20 of the package.

Carrier 200 has an edge wall 206 located at edge 24 of the package for the same purpose as edge walls 124 and 168. However, carrier 200 does not have an edge wall between edges 210 and 214 of walls 202 and 204, respectively. An edge wall between edges 210 and 214 is not necessary when the package is used in a magazine or other equipment having devices which prevent sheets of film from being withdrawn when the pouch is removed from the sheets. A magazine having a device of this kind is disclosed in copending U.S. patent application Ser. No. 07/558,271, filed July 25, 1990 in the names of M. L. Koelsch et al and entitled "Magazine for a Stack of Film Sheets". Thus, carried 116 and 160 need only a single edge wall when they are used in packages that are to be placed in magazines as disclosed in application Ser. No. 07/558,271. However if desired, carrier 200 can be provided with a second edge wall between wall edges 210,214 in the manner shown at 126 in FIG. 7.

Each of the notches 190, 192 has a semicircular inner edge and, except for one notch 190, each notch has parallel side edges. The exception is the notch 190 in wall 202 nearest side edge 210. This notch has a side edge 190a that tapers from its innermost end toward the side edge 210 so that the notch is wider at edge 208 than at its inner end. The edge 190a is not parallel to side edge 210 of wall 202 while other edges of notches 190 are parallel to edge 210.

The purpose of the tapered edge 190a is to prevent "stubbing" of a film sheet against edge 190a when a sheet has been partially removed from the carrier and then is reinserted. This may occur when the package is oriented as shown in FIG. 5 and the carrier is inverted from its FIG. 11 position. After the pouch is removed from the stack of film sheets and the carrier 200, the sheets can be removed seriatim from the top of the stack. More specifically, the sheet abutting wall 202 can be engaged by a sheet feeding device in the area between carrier side edges 212 and 216, and moved in a direction which pulls the trailing edge of the sheet away from carrier edge 210 and under notch edge 190a. Sometimes the sheet feeding device will pick up two film sheets at a time and begin removal of the sheets before a sensor detects the presence of more than one sheet. The sheet feeding device then will return the sheets to their original position in the stack. A sheet feeding device of this kind is used in equipment known as a Multiloader 700 that is sold by Eastman Kodak Company of Rochester, N.Y., U.S.A., and is disclosed generally in German Patent Application No. 37 05 851, filed Feb. 27, 1987. As the sheets are returned, the edge of the upper sheet passes edge 190a of the notch. If the edge 190a was perpendicular to edge 208 of the carrier, and thus, perpendicular to the path of travel of the sheet, the edge of the sheet could contact notch edge 190a and be stopped by the notch edge at least temporarily. This contact between the sheet edge and the edge 190a of the notch is referred to as "stubbing". By tapering edge 190a as described above, stubbing is avoided.

Usually, the known sheet feeding device will sense the feeding of multiple sheets before the trailing edge of the film reaches the second notch 190, i.e., the notch nearest edge 212. Thus, the second notch need not have a tapered edge. However, the second notch can be provided with a tapered edge when the carrier is part of a package to be used in equipment where the sheet feeding device may withdraw the trailing edge of the film past the second notch before sensing the presence of more than one sheet. Also, while the tapered side edge of the notch has been shown only with one notch on the carrier 200, it can be provided for one or more notches on carriers 116 and 160 too.

The present invention enables the package to be positioned in two different kinds of apparatus without alteration or modification. This simplifies the manufacturing process for the supplier of packages and also reduces the inventory of packages needed by the manufacture and by customers having the two different kinds of equipment that will receive the packages.

The invention has been described in detail with particular reference to preferred embodiments thereof, but it will be understood that variations and modifications can be effected within the spirit and scope of the invention.

What is claimed is:

1. In a package having a light-tight pouch enclosing a stack of rectangular sheets of film with each sheet in the stack having a side containing a photographic emulsion, the pouch comprising a first face and a second face positioned on opposite sides of the stack of sheets, the improvement wherein the pouch has flap portions extending beyond first and second adjacent side edges of the sheets in the stack, one of the flaps being engageable by a pouch removing mechanism in a first kind of equipment requiring the package to be oriented so that the flap at the first side edge of the package faces the pouch removing mechanism, and the other one of the flaps being engageable by a pouch removing mechanism in a second kind of equipment requiring the package to be oriented so that the flap at the second side edge of the package faces the pouch removing mechanism.

2. A package as set forth in claim 1 wherein the pouch comprises a heat sealable material, and the first and second faces being secured together around the stack of sheets by lines of heat seal that jointly define side edges of the package and enclose a generally rectangular space for the stack of sheets, the flap portions projecting from the lines of heat seal at first and second adjacent side edges of the package.

3. A package as set forth in claim 1 wherein the package has a first projecting portion extending beyond a third side edge of the sheets in the stack, and the package having a second projecting portion extending beyond a fourth side edge of the sheets in the stack, the third side edge being opposite the first side edge and the fourth side edge being opposite the second side edge, the projecting portions comprising the trailing end portions of the pouch when the pouch is removed by pulling either the first flap portion or the second flap portion.

4. A package as set forth in claim 3 wherein the first flap portion and the first projecting portions are removably attached to the first face of the pouch, and the second flap portion and the second projecting portion being removably attached to the second face of the pouch.

* * * * *